United States Patent
Wollack et al.

(10) Patent No.: US 10,663,350 B1
(45) Date of Patent: May 26, 2020

(54) TWO-DIMENSIONAL PHONONIC METAMATERIAL FILTER STRUCTURE FOR ULTRA-LOW-BACKGROUND DETECTORS

(71) Applicant: United States of America as represented by the Administrator of NASA, Washington, DC (US)

(72) Inventors: Edward J. Wollack, Clarksville, MD (US); David T. Chuss, Beryn, PA (US); Kevin L. Denis, Crofton, MD (US); Samuel H. Moseley, University Park, MD (US); Karwan Rostem, Glenarden, MD (US)

(73) Assignee: United States of America as represented by the Administration of NASA, Washington, DC (US)

( * ) Notice: Subject to any disclaimer, the term of this patent is extended or adjusted under 35 U.S.C. 154(b) by 0 days.

(21) Appl. No.: 16/015,450

(22) Filed: Jun. 22, 2018

(51) Int. Cl.
*G01J 5/20* (2006.01)
*G01J 5/06* (2006.01)
*G01J 5/02* (2006.01)

(52) U.S. Cl.
CPC ............ *G01J 5/06* (2013.01); *G01J 5/0205* (2013.01); *G01J 5/20* (2013.01)

(58) Field of Classification Search
CPC ..... G01K 7/02; G01K 7/01; G01J 5/06; G01J 5/0205; G01J 5/20; H01L 35/26; H01L 35/32
See application file for complete search history.

(56) References Cited

U.S. PATENT DOCUMENTS

| | | | | |
|---|---|---|---|---|
| 9,878,516 | B2* | 1/2018 | Glembocki | C23C 16/18 |
| 2013/0314765 | A1* | 11/2013 | Padilla | G01K 7/003 |
| | | | | 359/315 |
| 2017/0309779 | A1* | 10/2017 | Atanackovic | H01L 33/0012 |
| 2018/0356290 | A1* | 12/2018 | Winger | G01J 5/061 |
| 2018/0374981 | A1* | 12/2018 | Carr | H01L 31/12 |

OTHER PUBLICATIONS

Zen et al., "Engineering thermal conductance using a two-dimensional phononic crystal," Mar. 2014, Nature Communications pp. 1-9. (Year: 2014).*
Lee et al., "Elastic metamaterial-based impedance-varying phononic bandgap structures for bandpass filters," 2015, Journal of Sound and Vibration, vol. 353, pp. 58-74. (Year: 2015).*

* cited by examiner

*Primary Examiner* — Kiho Kim
(74) *Attorney, Agent, or Firm* — Heather Goo; Bryan A. Geurts (57) ABSTRACT

A phononic filter includes a metamaterial body including a membrane including a crystalline or amorphous dielectric material, an elemental superconductor or an alloyed superconductor; and a plurality of spaced features. The spaced features includes holes, spacings, or apertures in the metamaterial body.

36 Claims, 4 Drawing Sheets

TWO-DIMENSIONAL PHONONIC METAMATERIAL FILTER STRUCTURE FOR ULTRA-LOW-BACKGROUND DETECTORS

FIELD OF THE INVENTION

This invention relates to phononic metamaterial filters for thermal conductance definition in bolometric sensors as well as reduction and definition of mechanical coupling in other sensitive opto-mechanical devices.

BACKGROUND

Bolometers or bolometric detectors detect an increase in temperature when a thermally isolated membrane is heated by absorption of electromagnetic radiation. The change in temperature is typically sensed with a thermistor. If the thermistor is a superconducting metal biased on the sharp resistive transition, the resistance increases in response to the temperature increase. If the thermistor is made of a semiconductor, the resistance decreases in response to the temperature increase. At the operating temperatures of interest—in addition to Neutron-Transmutation-Doped (NTD) Ge, NbSi thin film thermometers, and metallic magnetic calorimeters (MMC)—superconducting transition edge sensors (TES), microwave kinetic inductance detectors (MKID), etc. can also be used to sense a change in absorbed power by monitoring a change in the device operating point through an appropriate monitoring circuit network.

Bulk materials, such as, for example, silicon and silicon nitride employing very long (1-2 mm) and narrow (~1 μm) bridges can be used for thermal isolation of a membrane in space-borne sub-mm/far-IR instruments, however, this approach can have multiple undesirable effects and disadvantages in practice. Focal plane architecture and scalability for use in large-format arrays as well as fabrication yield can be compromised. Furthermore, susceptibility of a detector to low-frequency mechanical vibrations (e.g., parasitic microphonic response) can be increased and ultimately degrade the sensor performance. As a result, the detector output may be modulated because of its low stiffness and coupling to other components in the focal plane architecture. Also, the heat capacity, response time and noise of the detector may be undesirable due to the thermal mass of the bridges. Still further, shielding against stray light or out-of-band radiation, which can couple through free-space absorption or directly into the readout circuitry, is challenging for pixel sizes approaching or greater than the shortest detected wavelength. Even further, the conductance of long bridges can be particularly sensitive to surface roughness and deposited organic residues introduced in device fabrication.

Exploration of narrow-band periodic one-dimensional phononic structures reveals the presence of higher order spectral leaks or, in a disordered limiting case, such structures can require relatively long structures with defects along the length to achieve the desired spectral response. From a fabrication and performance standpoint, such structures are problematic. Such structures can result in a reduction of the thermal conductance by increasing the porosity, however, this can require an extremely complex and high uniformity process for device repeatability given the exponential dependence on the underlying parameters.

Although periodic filter structures have been explored in two- and three-dimensions for two-transverse and one-longitudinal phonon modes, it would be desirable to have a broadband phononic filter that overcomes the above limitations in design and fabrication for controlling thermal and phonon transport as well as use of a fabrication method that would result in devices of the required length of scale while achieving lower conductance than possible in the ballistic limit.

BRIEF DESCRIPTION

In one embodiment, a phononic filter is provided. The phononic filter includes a metamaterial body including a membrane including a crystalline or amorphous dielectric material, an elemental superconductor or alloyed superconductor and a plurality of spaced features, the spaced features including holes, spacings or apertures in the metamaterial body.

In another embodiment, a circuit unit is provided. The circuit unit includes a dielectric membrane substrate, a phononic filter, a membrane component and a membrane electrical signal transmission structure that electrically connects the membrane component to an external electrical bias and readout circuitry. The phononic filter includes a metamaterial body including the dielectric membrane substrate and an electrically conducting transmission material deposited on the surface of the membrane substrate and a plurality of spaced features, the spaced features including holes, spacings or apertures in the metamaterial body.

In another embodiment, a circuit unit is provided. The circuit unit includes a dielectric membrane substrate, a phononic filter, a membrane component, an electrical signal transmission structure between the membrane component and the external bias and readout circuitry. The electrical signal transmission structure between the external device and the membrane substrate is carried on top of the phononic filter. The phononic filter includes a metamaterial body including the dielectric membrane substrate and an electrically conducting material deposited on the surface of the membrane substrate and a plurality of spaced features, the spaced features including holes, spacings or apertures in the metamaterial body.

In another embodiment, the dielectric substrate may be eliminated from the structure and replaced with an appropriately patterned superconducting metal membrane to realize the desired phononic filter and electrical functions.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Detailed description of the present invention will be illustrated herein below. Unless defined otherwise, technical and scientific terms used herein have the same meaning as is commonly understood by one of ordinary skill in the art to which this disclosure belongs.

The term "a" or "an" or "one" does not denote a limitation of quantity, but rather denote the presence of at least one of the referenced items. Approximating language, as used herein throughout the specification and claims, may be applied to modify any quantitative representation that could permissibly vary without resulting in a change in the basic function to which it is related. Accordingly, a value modified by a term or terms, such as "about" is not to be limited to the precise value specified. In some embodiments, "about" denote allowing the value modified in the range of plus or minus 10 percentages, like "about 100" denotes it can be any value between 90 and 100. Besides, in the term "about the first value to the second value", the "about" modify both the first and second value. In some instances, the approximating language may correspond to the precision of an instrument for measuring the value.

Embodiments of the present disclosure and aspects related thereto generally include providing a structure capable of controlling heat flow and phonon transport (hereinafter collectively referred to as phonon or phononic) in general over a specified broad spectral range to enable broadband isolation of micro-electro-mechanical structures through coherent filtering of phonons using phononic crystal patterns and tilings of difference sizes and shapes. The broadband isolation can be used to reduce thermal conductance in the context of bolometric sensors, or increase the coherence time of opto-electro-mechanical quantum states by reducing mechanical anchor losses and coupling to external systems. Aspects of the embodiments may also generally include a cascaded array of structures that are used to suppress phonon propagation over a wide band of wavelengths using a phononic metamaterial filter. The phononic metamaterial filter structure may generally include a series of periodic patterns of phononic metamaterial filter features, including, for example, holes, spacings or apertures. The phononic metamaterial can generally include a superconductor alone, or a membrane of generally low conductive dielectric material including, for example, silicon and silicon nitride with a superconductor layer. If only thermal isolation is required, embodiments including the use of an insulator for the membrane material can be used. The insulator can be crystalline (e.g., high resistivity silicon, diamond, sapphire, etc.) or amorphous (e.g., silicon nitride (SiNx), alumina (Al2O3), silica (SiOx), etc.) dielectric material or ceramic, however, heat capacity and microfabrication considerations favor Si for our application. This material can be referred to as an insulator or a dielectric—at the temperatures of interest—"semi-conducting" materials freeze out and are good dielectrics. A superconductor conducts electrically and is thermally isolating at the temperatures of interest. Due to the thermal/electrical properties superconducting elements below their transition temperature, a superconducting layer, or trace, can also be incorporated into the structure in order to facilitate electrical communication with the device without circumventing the function of the filter. The superconducting trace can be appropriately designed (e.g., thickness and patterning) for the membrane material to retain the desirable properties of the phononic filter.

Embodiments can include a dielectric membrane with the properties described above with the addition of a superconducting layer can be suitably patterned for use as a metamaterial phononic filter. The Cooper pairs in the superconducting layer can transport electrical signals without free electrons contributing to electrical heat conduction. The superconducting layer can be an elemental superconductor (e.g., Nb, Al, Mo, Ti, W, etc.), superconductor-dielectric alloy (i.e., a cermet such as AlN, NbN, NbTiN, etc.), or superconductor-metal alloy (e.g., AlMn, MoCu, NbTi, etc.), or a thin normal metal proximized by a superconducting layer (i.e., a non-superconductor such as Au, Cu, Ag, other). This superconducting material conducts electrically and is thermally isolating at the temperatures of interest. In practice, this means the transition temperature, Tc, of the superconducting layer must be large compared to the physical temperature the device is operated at.

The shape and tiling pattern of the holes, spacings or apertures can provide the allowable density of states of the phononic filter metamaterial to be tailored in its design. In some embodiments, superconducting wire or transmission structures can be used, for example, to convey electrical signals through the phononic metamaterial filter to membrane devices without significantly compromising the phonon transport, in particular, the thermal transport, properties of the membrane itself. The sizes of the features (e.g., holes, spacings or apertures) in the phononic metamaterial filter can be generally arranged in a unique pattern to suppress phononic waves traveling throughout the phononic metamaterial filter structure over wide frequency bandwidth.

Aspects of the embodiments may include a two-dimensional pattern of the phononic metamaterial filter features that can also be changed in size and/or tiling pattern in the filter and repeated as required to realize the desired phonon stop band or bands. Aspects of some embodiments may achieve such an effect by cascading a plurality of phononic metamaterial filter features that can differ in scale and/or tiling pattern in the phononic metamaterial resulting in coherent phonon scattering in the phononic filter structure. Aspects of other embodiments may realize such constructive interference over a broad spectral range using a plurality of different phononic metamaterial filters that are cascaded over a given area. Aspects of such phononic metamaterial filters include a cascaded plurality of phononic metamaterial filter features and a cascaded plurality of different phononic metamaterial filters or phononic metamaterial filter sections that may overcome limitations observed in, for example, one-dimensional narrow-band periodic filter structures or finite (or acceptably short) length structures.

Other aspects of the embodiments may include the desired phononic metamaterial filter feature's size and shape as well as the thickness of the membrane and conducting material deposited thereon can be used to provide a structure capable of filtering of phonon wavelengths. The use of a two-dimensional (2D) phononic metamaterial filter in some of the embodiments can lead to improved thermal rejection and a reduction in the required thermally isolated circuit area.

In general, the phononic filter may be patterned in a two-dimensional (2D) membrane which tailors the flow of phonons (that includes the flow of thermal phonons) between devices included as part of the membrane (e.g., a detector, a thermal sensor or heater, etc.) and external devices to which the membrane devices are connected (e.g., a thermal sensor or heater that receives an external electrical signal for, for example, power or a thermal reservoir which can be electrically connected to a detector included as part of the device). Generally, the phononic metamaterial filter includes phononic metamaterial containing phononic metamaterial filter features comprising holes, spacings or apertures, the size, shape and tiling pattern of the holes, spacings or apertures and/or thermal conducting material can provide the allowable density of states of the phononic metamaterial filter to be tailored in its design. The phononic metamaterial filter includes a membrane and a conducting film of conducting material, for example, conducting metal, the conducting material preferably being a superconducting film of superconducting material. The dielectric insulator can be crystalline (e.g., high resistivity silicon, diamond, sapphire, etc.) or amorphous (e.g., silicon nitride (SiNx), alumina (Al2O3), silica (SiOx), etc.) dielectric material or ceramic, however, heat capacity and microfabrication considerations favor Si for low temperature applications. The dielectric membrane with the properties described above can be used in conjunction with the addition of a superconducting layer suitably patterned for use as a metamaterial phononic filter. The Cooper pairs in the superconducting layer can transport electrical signals without free electrons contributing to electrical heat conduction. The superconducting layer can be an elemental superconductor (e.g., Nb, Al, Mo, Ti, W, etc.), superconductor-dielectric alloy (i.e., a cermet such as AlN, NbN, NbTiN, etc.), or superconductor-metal alloy (e.g., AlMn, MoCu, NbTi, etc.), or a thin normal metal proximized by a superconducting layer (i.e., a non-superconductor such as Au, Cu, Ag, other). This superconducting material conducts electrically and is thermally isolating at the temperatures of interest. In practice, this means the transition temperature, Tc, of the superconducting layer must be large compared to the physical temperature the device is operated at. These considerations naturally lead to three embodiments:

In an embodiment where only mechanical support is required the phononic material can be realized from a thin dielectric layer.

In an embodiment where mechanical support is required and electrical path as are needed for interrogation of membrane devices, the phononic material can be realized from a thin dielectric and superconducting layers.

In an embodiment where the dielectric layer is not needed for mechanical support or definition of non-electrically conducting regions within the phononic filter the dielectric layer may be removed in processing.

The thickness of the dielectric membrane (high resistivity silicon) can be from about 0.1 micron to about 0.5 micron, preferably about 0.3 micron. The thickness of the conducting material can be from about 10 nm to about 100 nm, preferably about 40 nm, and preferably for the preferable superconducting metal (thin niobium or aluminum) mentioned above, the thickness can be from about 10 nm to about 100 nm, preferably about 40 nm. The size, shape and tiling pattern of the holes, spacings or apertures can also vary.

Figure 1:
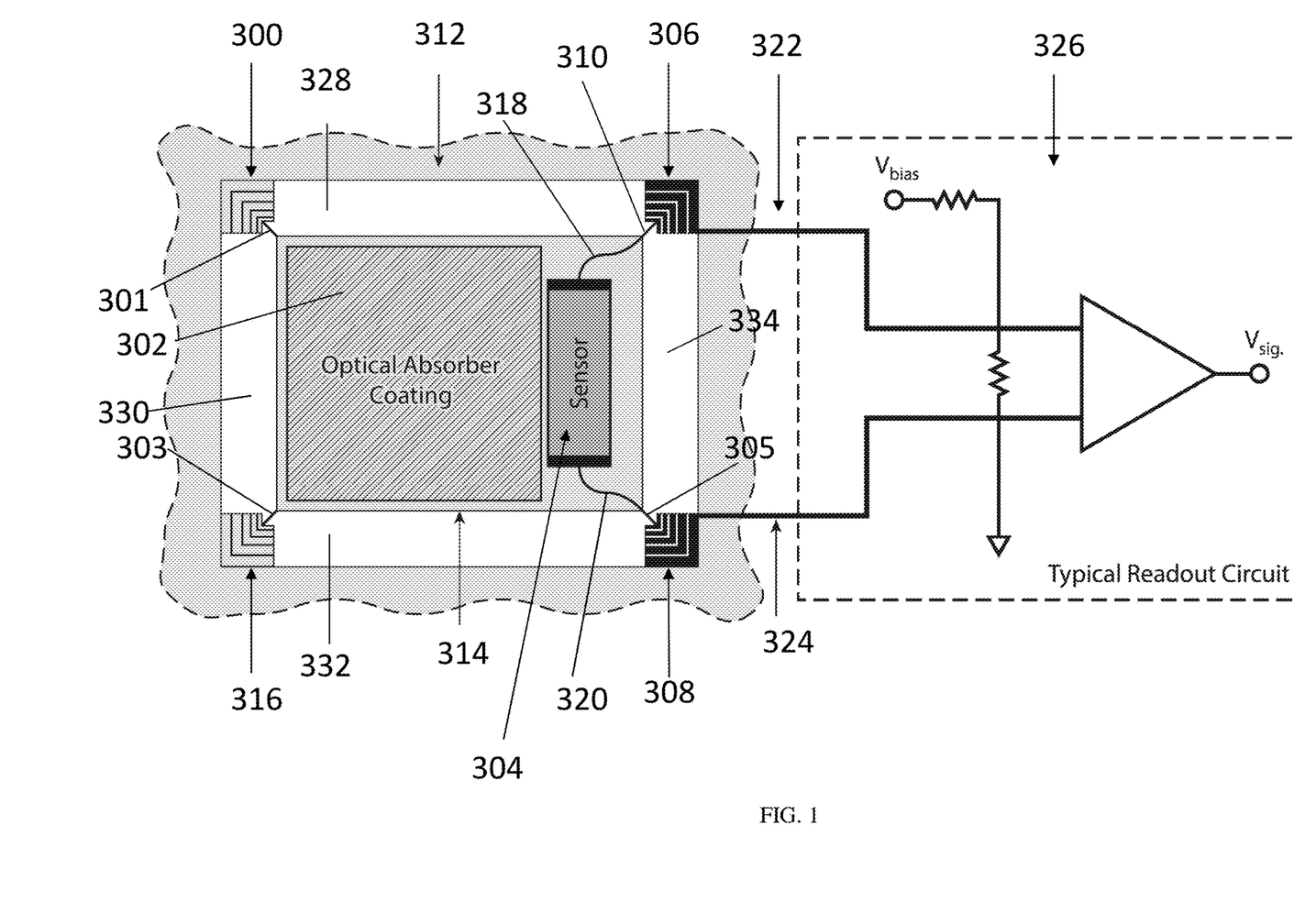
FIG. 1 is a schematic illustration of one embodiment of a bolometric sensor employing a phononic metamaterial filter with readout.

In some embodiments, a ballistic leg (preferably a short ballistic leg) can be used as a contact point between an external element (e.g., a thermal reservoir) to which a membrane device (e.g., a thermal detector) is connected. As such, the ballistic leg may act as an initial filter for the thermal radiation and as a Huygen's source to illuminate the phononic metamaterial filter structure from the leg (e.g., for a square membrane four legs would emanate diagonally from the corners and the phononic metamaterial filter would reside in the region where membrane has been removed, for example, in FIG. 1, areas 328, 330, 332, 334. The ballistic leg may serve as a transition to the phononic metamaterial filter to which the ballistic leg is connected and may apodize the phonon field to prevent illumination of the boundaries of the phononic metamaterial, thereby approximating a media without edges between the ballistic leg and the phononic metamaterial filter. This may allow the thermal conductance to be specified for an ultra-low-background power detector, however, other configurations are possible.

The pattern of phononic metamaterial filter features including, for example, the size, shape and tiling pattern of the holes, spacings or apertures, may form a broadband stop-filter by allowing power to be transmitted and reflected over a specified range of frequencies. The size of the holes, spacings or apertures can vary from about 25 nm to about 1000 nm, preferably from about 20 nm to about 900 nm. The phononic metamaterial filter can include sub-arrays including cascading a plurality of phononic filter metamaterial features that can differ in size, shape and/or tiling pattern in the phononic metamaterial or a plurality of phononic metamaterial filters or filter sections whose features can differ in size, shape and/or tiling pattern, each forming a sub-array. For example, the sub-arrays can be arranged such that the components of the sub-array generate various filter band responses resulting in an ultra-wide signal rejection bandwidth. In one embodiment, the features (e.g., holes, spacings or apertures) smallest in size can be placed near the input from the phononic metamaterial filter to the device included as part of the membrane (e.g., a detector, a thermal sensor or heater, etc.) to which the filter is connected and the largest features (e.g., holes, spacings or apertures) can be placed radially outward, or as required by the tiling in use, from the input. In another embodiment, the features (e.g., holes, spacings or apertures) largest in size can be placed near the input from the phononic metamaterial filter to the device included as part of the membrane (e.g., a detector, a thermal sensor or heater, etc.) to which the filter is connected and the smallest features (e.g., holes, spacings or apertures) can be placed radially, or as required by the tiling in use, outward from the input. In yet another embodiment, the features (e.g., holes, spacings or apertures) can alternate or differ between different sections or sub-arrays of the phononic metamaterial filter. Some other embodiments can also include optional sub-array features that can be placed interleaving between other members of sub-array to help increase the transmission isolation between input and output port further. As a result, the phononic metamaterial filter can be designed to reject signals over an ultra-wide-bandwidth. The phonon wavelength and the largest/smallest realizable features in the membrane can be set to a designed and achievable spectral range. By limiting the phononic density of states in the 2D phononic metamaterial filter, the structure may be able to minimize the modes available for thermal transport across the membrane.

One embodiment is illustrated in FIG. 1. FIG. 1 includes a frame 312, a membrane 314, a heater 302, for example, a light-to-heat converter that generates heat in response to certain electromagnetic wavelengths and a thermometer 304 (e.g., a Johnson noise (JN) thermometer). Frame 312 may be silicon, silicon nitride, sapphire, or any other suitable dielectric material. At the temperatures of interest silicon is a near ideal dielectric (i.e., electron carriers freeze out and no longer electrically serve as a semiconductor). The membrane can be a crystalline or amorphous dielectric, an elemental superconductor, or a superconducting alloy depending on the desired end need. The device also includes phononic metamaterial filters 300, 306, 308, 316. Phononic metamaterial filters 300, 306, 308, 316 can be 2D filters as illustrated in this embodiment. Electrical signal transmission structures 318 and 320 provide connections over the phononic metamaterial filters 306 and 320, respectively, and, in some realizations not depicted in FIG. 1, to heater 302. Electrical signal transmission structures 318 and 320 provide connection over the phononic metamaterial filters 306 and 308, respectively, and, in turn, to JN thermometer 304. Electrical transmission structures 318, 320, 322, 324 include regions of the membrane in which is deposited conducting material, preferably superconducting material, for example, superconducting metal, such as niobium and can be integrated with the conducting material that is part of the phononic metamaterial filter to which the membrane transmission structure is connected. Electrical transmission structures 322 and 324 are the continuation of 318 and 320. The ballistic legs 301, 303, 305, 310 provide a contact between the membrane and the phononic filters. The electrical transmission structures 318 and 320 are deposited over the ballistic legs 310 and 305, and continue over the phononic filters 306 and 308 as 322 and 324. Membrane 314 may also be thermally linked to one or a plurality of thermal baths that, for example, may include the frame 312 of the membrane 314. In the embodiment of FIG. 1, the areas 328, 330, 332 334 are etched to define the membrane area 314. The phononic metamaterial filters 300, 306, 308, 316 can substantially isolate the membrane 314 from external phonons that could interfere with the heat signal from the heater 302 to the thermometer 304 and with the thermal reading of that heat signal by the thermometer 304, resulting in noise and a less accurate reading by the thermometer.

Phononic metamaterial filters 300, 306, 308, 316 can be 2D filters as illustrated in this embodiment. Electrical signal to the sensor is carried by metal traces 318 and 320 on the membrane, which are in contact and deposited over the phononic metamaterial filters 306 and 308. The electrical signal transmission structures 318 and 320 include regions of the membrane in which is deposited conducting material, preferably superconducting material, for example, superconducting metal, such as niobium and can be integral with the conducting material that is part of the phononic metamaterial filter to which the membrane transmission structure is connected. The conducting material 322 and 324 connect external elements to membrane devices through the phononic metamaterial filters. For example, in the embodiment of FIG. 1, conducting material 322 is connected to phononic metamaterial filter 306 and conducting material 324 is connected to phononic metamaterial filter 308. Conducting material 322 and 324 in turn are connected to readout circuit 326 that may be separate from or part of the frame 312. Membrane 314 may also be in thermal contact to one or a plurality of thermal baths that, for example, the frame 312 may be connected to the membrane 314. Because of the extreme sensitivity of the optical absorber coating 302 and sensor 304 needed, the phononic metamaterial filters 300, 306, 308 and 316 can substantially isolate and filter external phonons that could interfere with the heat signal from the optical absorber coating 302 to the sensor 304 and with the thermal reading of that heat signal by the sensor 304, resulting in noise and a less accurate reading by the sensor 304 being transmitted to the readout circuit 326.

Figure 2:
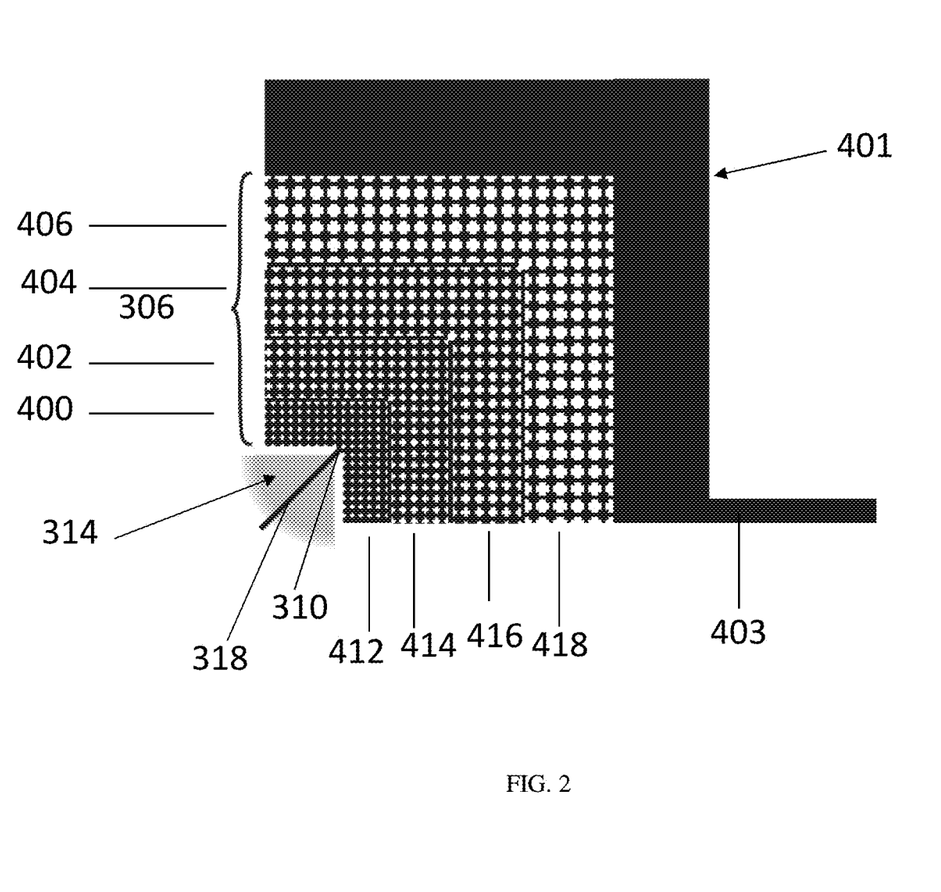
FIG. 2 is a schematic illustration of magnified view of the phononic metamaterial filter of FIG. 1 showing a detailed embodiment of a phononic metamaterial filter.

FIG. 2 is a magnified view of FIG. 1 and phononic metamaterial filter 306 including electrical transmission structures 318, superconducting metal trace 401 and ballistic leg 403 which includes conducting material 322 from FIG. 1. Phononic metamaterial filter 306 may include a plurality of phononic metamaterial filter sections 400, 402, 404, 406, each extending in two dimensions from a one-dimensional contact 310. Each phononic metamaterial filter sections 400, 402, 404, 406 may include holes, spacings or apertures in the general shape of a cross of different sizes depending on the phononic metamaterial filter section in which they reside. However, a different embodiment could include different size and shape holes, spacings or apertures within the phononic metamaterial filter section in which they reside or among the different phononic metamaterial filter sections.

Although FIG. 2 illustrates phononic metamaterial filter 306 including a plurality of phononic metamaterial filter sections 400, 402, 404 and 406, embodiments can include one or more of phononic metamaterial filters 306 and 308 including one or more such phononic metamaterial filter sections.

The size of the holes, spacings or apertures can vary depending on the desired phononic filtering effects as shown in FIG. 2 in which holes, spacings or apertures 412 of phononic metamaterial filter sections 400 are the smallest in size of those shown in the embodiment; holes; spacings or apertures 414 of phononic metamaterial filter sections 402 are the next largest; holes, spacings or apertures 416 of phononic metamaterial filter sections 404 are the next largest; and holes, spacings or apertures 418 of phononic metamaterial filter sections 406 are the largest. Although the holes, spacings or apertures of phononic metamaterial filter sections 400, 402, 404, 406 progress from smallest in size to largest in size as the filter sections extend away from membrane transmission structure 318, embodiments where the size of holes, spacings or apertures in an array of phononic metamaterial filter sections can also progress from largest to smallest extending away from membrane transmission structure 318 or where the size of such holes, spacings or apertures in adjacent phononic metamaterial filter sections is not ordered from smallest to largest or largest to smallest extending away from membrane transmission structure 318. Furthermore, as with the embodiment illustrated in FIGS. 1 and 2, the size of the holes, spacings or apertures of phononic metamaterial filter sections 400, 402, 404, 406 are such that the smaller holes, spacings or apertures filter higher frequencies than the larger holes, spacings or apertures and, in turn, the larger holes, spacings or apertures filter lower frequencies than the smaller holes, spacings or apertures.

The tiling pattern of the holes, spacings or apertures in the embodiments illustrated in FIG. 2 are generally a square tiling pattern for phononic metamaterial filter sections 400, 402, 404, 406. However, other embodiments can include other tiling patterns, such as, for example, triangular or hexagonal tilings. Furthermore, the tiling pattern of holes, spacings or apertures can be the same among all the phononic metamaterial filter sections or different among the phononic metamaterial filter sections that make up a phononic metamaterial filter or in the overall phononic metamaterial filter itself.

The pattern scaling of the holes, spacings or apertures can be any function (smooth or discontinuous as in the example shown) and that in the smooth case, a self-similar structure may be produced by design. For example, embodiments can include the spaced features change according to a smooth functional form that approximates a self-similar structure such that, for example, the diameter, or size of a unit cell, can be scaled by a continuously varying function. In for other words, for example, the size of a unit cell can change according to a linear function of position. In practice, more complex functional forms are known to provide a better performance. As discussed above, embodiments of the phononic filter can include a superconducting media without a dielectric substrate.

Figure 3:
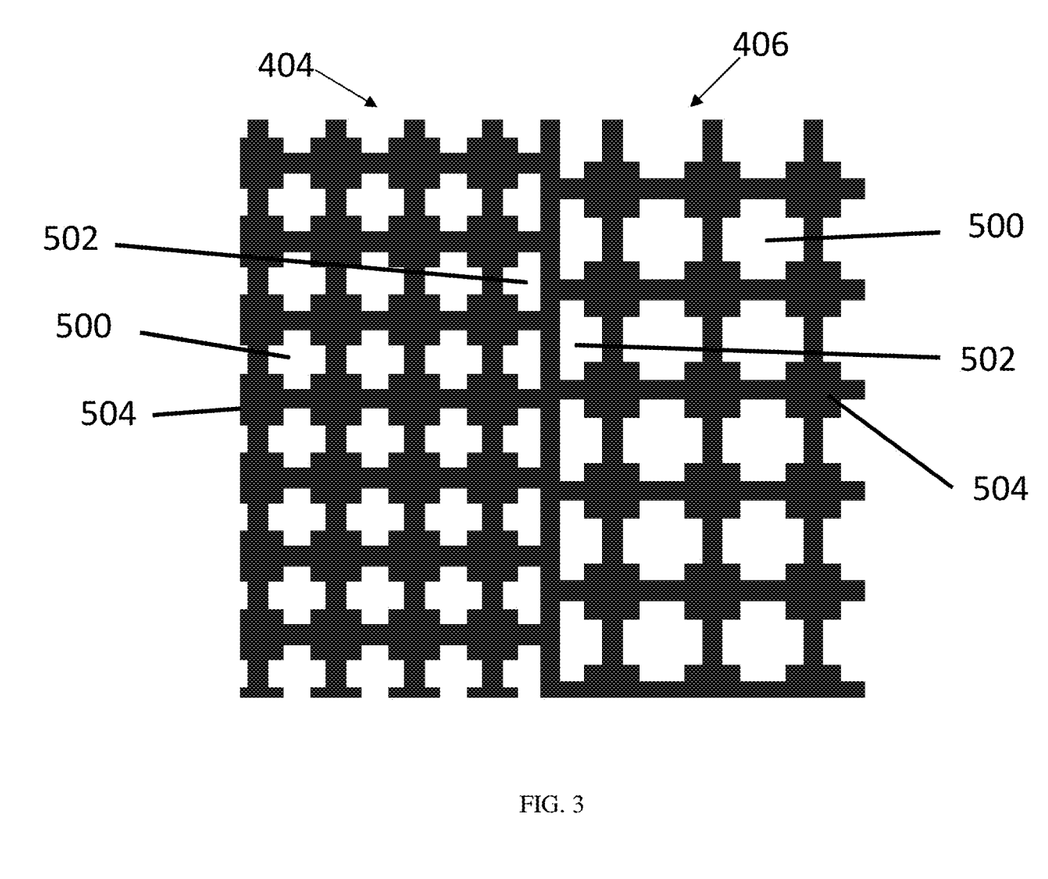
FIG. 3 is a schematic illustration of magnified view of the phononic metamaterial filter of FIG. 2 including one embodiment of a junction between phononic metamaterial filter stages with differing geometries.

FIG. 3 illustrates a magnified view of a portion of an embodiment of a phononic metamaterial filter including holes, spacings or apertures 500 and 502 with phononic metamaterial 504, where holes, spacings or apertures 502 can be in the general shape of a "T" and holes, spacings or apertures 500 can be in the general shape of a cross. The shape of the holes, spacings or apertures can vary depending on the desired phononic filtering effects and can include, for example, circles, squares, diamonds (aka, squares turned 90°), triangles, "T" shapes, and cross-like shapes. As with the size, the shape of holes, spacings or apertures can be the same among all the phononic metamaterial filter sections or different among the phononic metamaterial filter sections that make up a phononic metamaterial filter or in the overall phononic metamaterial filter itself.

The size, tiling pattern and shape of the holes, spacings or apertures can vary depending on the desired phononic filtering effects.

Figure 4:
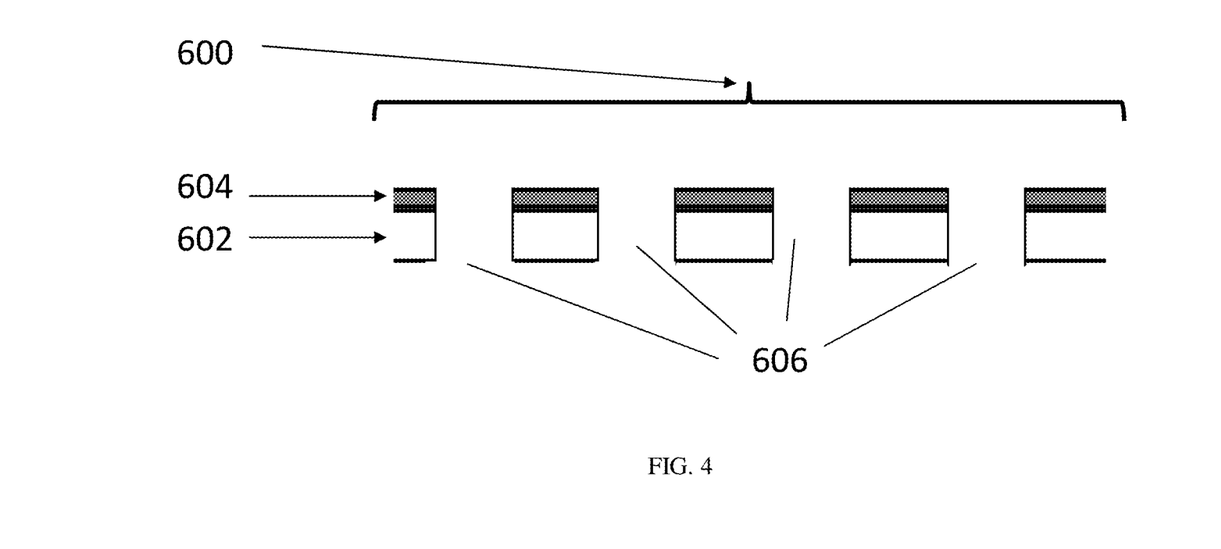
FIG. 4 is an illustration of a crossectional view of an embodiment of the holes, spacings or apertures of a phononic metamaterial filter.

FIG. 4 is an illustration of an embodiment of a portion of phononic metamaterial filter 600 and a cross-section view thereof. Included is the membrane 602 including, for example, a semiconductor, deposited conducting material 604 (preferably superconducting material, for example, superconducting metal or superconducting alloy) and holes, spacings or apertures 606.

In another embodiment, the superconductor mechanically suspends the dielectric membrane substrate from a frame.

The embodiments and phononic metamaterial filters included herein may be fabricated using photo-resist coatings for optical lithography technology for holes, spacings or apertures greater in size than about 1 μm and electron beam technologies for holes, spacings or apertures lesser in size than about 1 μm.

The embodiments and phononic metamaterial filters included herein may operate using frequency selective surface and classical filter theories and in addition higher-dimensional phononic quasi-crystals (2D and 3D) offer greater flexibility over 1D structures in the design of their geometry and response. Along with the increase in geometric complexity is a corresponding increase in the complexity of the mathematical description of the phonon (acoustic) propagation. With physical insight this limitation can be overcome and designs in practice are largely realized through numerical modeling and subsequent experimental validation. The embodiments and phononic metamaterial filters included herein can be designed to operate at any phonon frequency band or bandwidth, given the ability to generate precise features of appropriate size in the bulk material. The embodiments and phononic metamaterial filters included herein do not have safety, storage, or handling issues beyond that encountered in microfabrication of similar sensor structures.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A phononic filter, the phononic filter comprising:
   a metamaterial body comprising a membrane comprising a crystalline or amorphous dielectric material, an elemental superconductor or an alloyed superconductor;
   a plurality of spaced features, the spaced features including holes, spacings, or apertures in the metamaterial body, wherein the plurality of spaced features, the spaced features including holes, spacings or apertures in the metamaterial body include a plurality of phononic filter sections where the plurality of spaced features in adjacent phononic filter sections differ to form a pattern; and
   at least one ballistic leg.

2. The phononic filter of claim 1, wherein the crystalline dielectric material is high resistivity silicon or diamond and the amorphous dielectric material is silicon nitride or silicon oxide.

3. The phononic filter of claim 1, wherein the membrane is Si.

4. The phononic filter of claim 1, wherein the elemental superconductor is an elemental superconducting metal including Nb, Al, Ti or W, and the alloyed superconductor includes AlN, NbN or NbTiN.

5. The phononic filter of claim 4, wherein the superconductor is aluminum.

6. The phononic fitter of claim 1, wherein the size of the spaced features ranges from about 50 nm to about 900 nm.

7. The phononic filter of claim 1, wherein the shape of at least one feature is a circle, a square, a diamond, a triangle, a "T" shape, or a cross shape.

8. The phononic filter of claim 1, wherein the tiling pattern of the plurality of spaced features is a square pattern, a diamond pattern, a hexagon pattern or a triangle pattern.

9. The phononic filter of claim 1, wherein the phononic filter is a two-dimensional (2D) filter.

10. A phononic lifter, the phononic filter comprising:
    a metamaterial body comprising a membrane comprising a crystalline or amorphous dielectric material, an elemental superconductor or an alloyed superconductor;
    a plurality of spaced features, the spaced features including holes, spacings, or apertures in the metamaterial body, wherein the plurality of spaced features in adjacent phononic fitter sections differ in at least one of feature size, feature shape and feature tiling pattern; and
    at least one ballistic leg.

11. The phononic filter of claim 10, wherein the crystalline dielectric material is high resistivity silicon or diamond and the amorphous dielectric material is silicon nitride or silicon oxide.

12. The phononic filter of claim 10, wherein the membrane is Si.

13. The phononic filter of claim 10, wherein the elemental superconductor is an elemental superconducting metal including Nb, Al, Ti or W, and the alloyed superconductor includes AlN, NbN or NbTiN.

14. The phononic filter of claim 13, wherein the superconductor is aluminum.

15. The phononic fitter of claim 10, wherein the size of the spaced features ranges from about 50 nm to about 900 nm.

16. The phononic filter of claim 10, wherein the shape of at least one feature is a circle, a square, a diamond, a triangle, a "T" shape, or a cross shape.

17. The phononic filter of claim 10, wherein the tiling pattern of the plurality of spaced features is a square pattern, a diamond pattern, a hexagon pattern or a triangle pattern.

18. The phononic filter of claim 10, wherein the phononic filter is a two-dimensional (2D) filter.

19. A circuit unit, the circuit unit comprising:
    a dielectric membrane substrate;
    a phononic filter, the phononic filter comprising:
        a metamaterial body including the dielectric membrane substrate; and a plurality of spaced features, the spaced features including holes, spacings or apertures in the metamaterial body, wherein the plurality of spaced features, the spaced features including holes, spacings or apertures in the metamaterial body including a plurality of phononic filter sections where the plurality of spaced features in adjacent phononic filter sections differ, and at least one ballistic leg;

a membrane device; and a membrane transmission structure between the membrane device and the phononic fitter.

20. The circuit unit of claim 19, wherein the dielectric membrane substrate is a highly-ordered crystal or amorphous dielectric material.

21. The circuit unit of claim 19, wherein the dielectric material is Si.

22. The circuit unit of claim 19, wherein an electrical signal transmission structure is deposited on a surface of the membrane substrate.

23. The circuit unit of claim 19, wherein the size of the spaced features ranges from about 50 nm to about 700 nm.

24. A circuit unit, the circuit unit comprising:

a dielectric membrane substrate;

a phononic filter, comprising:
  a metamaterial body comprising a membrane comprising a crystalline or amorphous dielectric material, an elemental superconductor, or an alloyed superconductor; and
  a plurality of spaced features, the spaced features including holes, spacings or apertures in the metamaterial body, wherein the plurality of spaced features, the spaced features including holes, spacings or apertures in the metamaterial body including a plurality of phononic filter sections where the plurality of spaced features in adjacent phononic filter sections differ, and
  at least one ballistic leg;

a membrane device on the dielectric membrane substrate;

an electrical signal transmission structure between the membrane device and the phononic filter;

an external device; and a second electrical signal transmission structure between the external device and the dielectric membrane substrate.

25. The circuit unit of claim 24, wherein the elemental superconductor comprises a superconducting metal, where the superconducting metal suspends the dielectric membrane substrate from a frame.

26. The circuit unit of claim 24, wherein the wherein the shape of at least one feature is a circle, a square, a diamond, a triangle, a "T" shape or a cross shape.

27. The circuit unit of claim 24, wherein the size of the spaced features ranges from about 50 nm to about 900 nm.

28. A circuit unit, the circuit unit comprising:

a dielectric membrane substrate;

a phononic filter, the phononic filter comprising:
  a metamaterial body including the dielectric membrane substrate; and
  a plurality of spaced features, the spaced features including holes, spacings or apertures in the metamaterial body, wherein the plurality of spaced features in adjacent phononic filter sections differ in at least one of feature size, feature shape and feature filing pattern, and
  at least one ballistic leg;

a membrane device; and a membrane transmission structure between the membrane device and the phononic filter.

29. The circuit unit of claim 28, wherein the dielectric membrane substrate is a highly-ordered crystal or amorphous dielectric material.

30. The circuit unit of claim 29, wherein the dielectric material is Si.

31. The circuit unit of claim 28, wherein an electrical signal transmission structure is deposited on a surface of the membrane substrate.

32. The circuit unit of claim 28, wherein the size of the spaced features ranges from about 50 nm to about 700 nm.

33. The circuit unit of claim 32, wherein the size of the spaced features ranges from about 50 nm to about 900 nm.

34. A circuit unit, the circuit unit comprising:

a dielectric membrane substrate;

a phononic filter, the phononic filter comprising:
  a metamaterial body comprising a membrane comprising a crystalline or amorphous dielectric material, an elemental superconductor, or an alloyed superconductor; and
  a plurality of spaced features, the spaced features including holes, spacings, or apertures in the metamaterial body, wherein the plurality of spaced features in adjacent phononic filter sections differ in a least one of feature size, feature shape and feature tiling pattern, and
  at least one ballistic leg;

a membrane device on the dielectric membrane substrate;

an electrical signal transmission structure between the membrane device and the phononic fitter;

an external device; and a second electrical signal transmission structure between the external device and the dielectric membrane substrate.

35. The circuit unit of claim 34, wherein the elemental superconductor comprises a superconducting metal, where the superconducting metal suspends the dielectric membrane substrate from a frame.

36. The circuit unit of claim 34, wherein the shape of at least one feature is a circle, a square, a diamond, a triangle, a "T" shape or a cross shape.

* * * * *